(12) United States Patent
Stearns

(10) Patent No.: US 10,487,525 B1
(45) Date of Patent: Nov. 26, 2019

(54) ELECTRICALLY POWERED POOL VACUUM CLEANER

(71) Applicant: Kenneth W Stearns, Houston, TX (US)

(72) Inventor: Kenneth W Stearns, Houston, TX (US)

( * ) Notice: Subject to any disclaimer, the term of this patent is extended or adjusted under 35 U.S.C. 154(b) by 91 days.

(21) Appl. No.: 15/872,135

(22) Filed: Jan. 16, 2018

Related U.S. Application Data

(60) Provisional application No. 62/507,492, filed on May 17, 2017.

(51) Int. Cl.

| | | |
|---|---|---|
| *E04H 4/16* | (2006.01) | |
| *F04D 29/18* | (2006.01) | |
| *B01D 29/27* | (2006.01) | |
| *F04D 13/06* | (2006.01) | |
| *F04D 13/08* | (2006.01) | |
| *F04D 29/049* | (2006.01) | |

(52) U.S. Cl.
CPC ........... *E04H 4/1654* (2013.01); *B01D 29/27* (2013.01); *E04H 4/1636* (2013.01); *F04D 13/068* (2013.01); *F04D 13/086* (2013.01); *F04D 29/049* (2013.01); *F04D 29/186* (2013.01)

(58) Field of Classification Search
CPC ............................ E04H 4/1636; E04H 4/1654
See application file for complete search history.

(56) References Cited

U.S. PATENT DOCUMENTS

| | | | |
|---|---|---|---|
| 4,100,641 A * | 7/1978 | Pansini ................. | E04H 4/1654 15/1.7 |
| 2011/0258789 A1 * | 10/2011 | Lavabre ................ | E04H 4/1654 15/1.7 |

* cited by examiner

*Primary Examiner* — Randall E Chin
(74) *Attorney, Agent, or Firm* — Nick A Nichols, Jr.

(57) ABSTRACT

An electrically powered pool cleaner may include a housing defining an axial passageway. A rotatable sleeve impeller may be supported by the housing within the axial passageway. The axial passageway may include an unobstructed central portion for passage of fluid and pool debris therethrough into a filter bag removably connected to the housing. A motor may be operatively connected to the sleeve impeller and a power supply operatively connected to the motor. Rotation of the sleeve impeller may accelerate fluid flow through the axial passageway for drawing debris in the pool into the filter bag.

11 Claims, 2 Drawing Sheets

ELECTRICALLY POWERED POOL VACUUM CLEANER

CROSS-REFERENCE TO RELATED APPLICATION

This application claims priority to and the benefit of the filing date of U.S. Provisional Application Ser. No. 62/507,492, filed May 17, 2017, which application is herein incorporated by reference in its entirety.

BACKGROUND

The present invention relates to pool cleaners, and in particular to electrically powered swimming pool vacuums.

Electrically powered pool vacuums are similar in many respects to manually operated pool cleaners that use a garden hose attached to the cleaner to create suction to pull leaves and other debris off the bottom of the pool. Instead of water pressure, however, electrically powered pool cleaners generally include a motor and an impeller to create the suction required to pull leaves from the bottom of the pool. These pool cleaners may be battery powered and some may include a battery located out of the pool with a power cord connected to the vacuum unit in the pool. Others may include a battery compartment on the cleaner housing. The motor and impeller are typically in the water flow path through the vacuum unit. A collection bag attached to the top of the vacuum unit captures the leaves and debris for disposal away from the pool.

SUMMARY

An electrically powered pool cleaner may include a housing defining an axial passageway. A rotatable sleeve impeller may be supported by the housing within the axial passageway. The axial passageway may include an unobstructed central portion for passage of fluid and pool debris therethrough into a filter bag removably connected to the housing. A motor may be operatively connected to the sleeve impeller and a power supply operatively connected to the motor. Rotation of the sleeve impeller may accelerate fluid flow through the axial passageway for drawing debris in the pool into the filter bag.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figure 1:
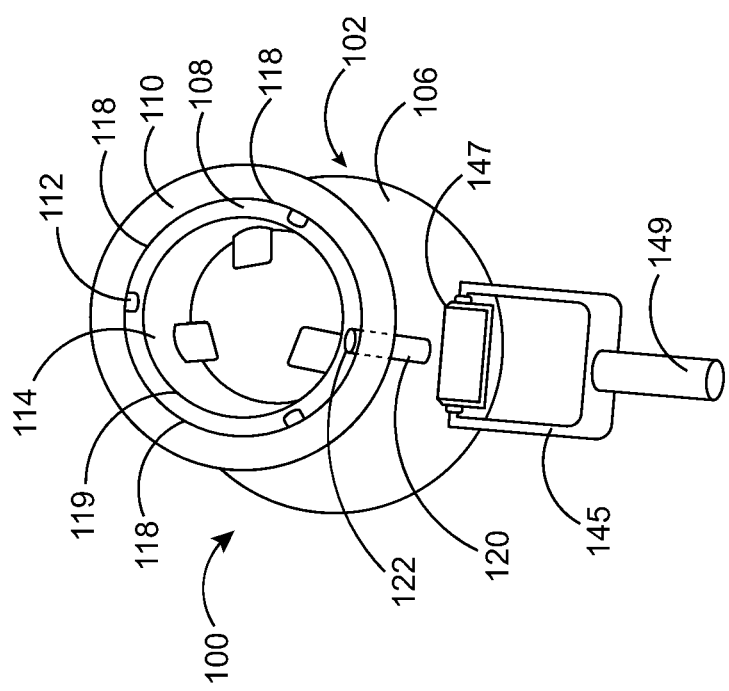
FIG. 1 is a perspective view of an electrically powered pool cleaner.

Referring first to FIG. 1, an electrically powered pool vacuum cleaner is generally identified by the reference numeral 100. The pool vacuum cleaner 100 may be submersed in a swimming pool or other water-filled structure and operated to remove debris, such as leaves, dirt and twigs, from the bottom and wall surface of the pool. The pool vacuum cleaner 100 may include a housing 102 mounted on a plurality of wheels 104 (shown in FIG. 4) for moving the pool vacuum cleaner 100 over the surface of the pool. The housing 102 may include a flared base 106 and a generally cylindrical conduit 108 extending upwardly from the base 106. The upper end of the cylindrical conduit 108 may be circumscribed by a radially extending flared lip 110.

The cylindrical conduit 108 defines an axial passageway 112 extending through the housing 102. The cylindrical portion 108 may be integrally formed with the base 106 and flared lip 110. Alternatively, the cylindrical conduit 108 may snap on or otherwise connected to the base 106. The lower end of the passageway 112 defines an inlet port for the pool vacuum cleaner 100 and the upper end thereof defines a discharge outlet. A removable flexible mesh filter bag (not shown in the drawings) having an opening at one end may be slipped over the flared lip 110 and a draw string tightened to hold the filter bag in place. Water and debris in the pool may be drawn through the passageway 112 and into the filter bag where the debris is trapped in the filter bag and the filtered water passes through the mesh bag back into the pool.

Figure 2:
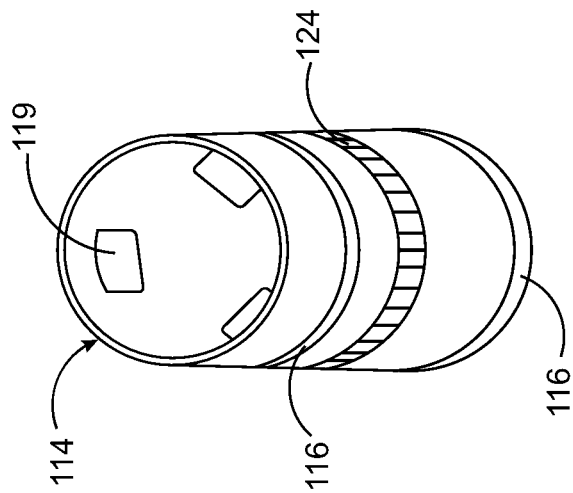
FIG. 2 is a perspective view of a sleeve component of the pool cleaner shown in FIG. 1.

An impeller or sleeve 114 may be mounted within the passageway 112 of the housing 102. The sleeve 114 may be rotatably secured within the cylindrical conduit 108 of the housing 102. The sleeve 114 may include one or more circumferential grooves 116, best shown in FIG. 2, formed on the external surface of the sleeve 114. The grooves 116 may be sized to receive a plurality of rollers 118 which rotatably support the sleeve 114 within the housing 102. The cylindrical conduit 108 of the housing 102 may also include internal circumferential grooves located opposite the grooves 116 for cooperatively supporting the rollers 118 therebetween.

Blades 119 may be fixedly secured to the internal surface of the sleeve 114. The blades 119 project toward the center of the passageway 112 and are configured so that upon rotation of the sleeve 114, fluid flow is accelerated upwardly through the center core of the fluid passageway 112. Water and debris in the pool from below the pool vacuum cleaner 100 may be drawn upwardly through the passageway 112 and into the filter bag where the debris is trapped in the filter bag and the filtered water passes through the mesh bag back into the pool.

One or more sets of blades 119 vertically spaced from one another may be fixedly secured to the sleeve 114. The blades 119 may extend toward the axial center of the sleeve 114 without obstructing the central portion of the fluid passageway 112. Water and entrained debris may thereby flow through the unobstructed central portion of the passageway 112 into the collection mesh bag.

Continuing with FIG. 1, a motor 120 may be mounted on the exterior of the housing 102. The motor 120 may be of a type suitable for underwater operation. The motor 120 may drive a pinion gear 122 engaging a ring gear 124 mounted on the exterior surface of the sleeve 114.

Electrical energy to operate the motor 120 may be provided by batteries located on the housing 102. Alternatively, battery power may be provided remotely through an electrical cord connecting the batteries to the motor 120. Under remote operation, a switch may be provided to operate the pool cleaner 100 in turbo mode.

Figure 3:
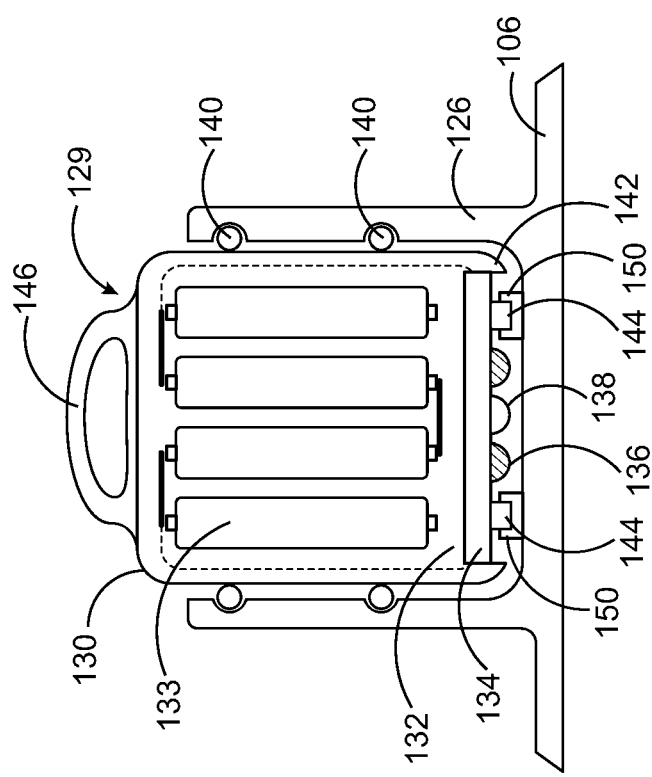
FIG. 3 is a section view of a battery compartment and a battery cartridge of the pool cleaner shown in FIG. 1.

Referring now to FIG. 3, a battery compartment 126 housing a removable battery cartridge 129 may be mounted on the base 106 or integrally formed with the base 106. The battery compartment 129 may be open at one end and closed at its opposite end. The battery cartridge 129 may include a battery housing 130. For purposes of illustration, but without limitation, the battery housing 130 may be cylindrical in shape and include a cavity 132 to house a plurality of AA batteries 133 or alternatively, rechargeable batteries. The battery housing 130 may be sealed by an end cap 134 that may be threadedly connected to internal threads formed proximate at the open end of the battery housing 130. Other modes of securing the end cap 134, such as screws or tabs, may also be employed. Externally located contacts on the end cap 134, such as a ring contact 136 and a button contact 138, may be electrically connected to the batteries 133.

The battery compartment 126 may be a separate unit mounted on the housing 102 or may be integrally formed with the base 106 of the housing 102. The battery compartment 126 is sized and configured to receive the battery cartridge 129 in a waterproof compartment. One or more 0-ring seals 140 provide a seal between the battery compartment 126 and the battery cartridge 129. The distal end of the battery housing 130 may include an inwardly tapered region 142 to aid with the insertion of the battery cartridge 129 into the battery compartment 126. Alignment tabs 144 may be included on the end cap 134. The tabs 144 may be received in alignment slots 150 in the battery compartment 126 to ensure that the battery cartridge 129 properly engages electrical contacts to complete the electrical circuit with the motor 120. A handle 146 on the battery housing 130 may be provided for convenient insertion or removal of the battery cartridge 129 from the battery compartment 126.

Referring again to FIG. 1, a coupling 145 may be pivotally attached to a bracket 147 which is connected to the base 106 of the housing 102. The coupling 145 may be of a configuration known in the art, for example, a swivel fork configuration and the like. The coupling 145 may include a connecting shaft 149 projecting therefrom. The shaft 149 may be received in a distal end of a hollow telescoping pole adapted for guiding the pool vacuum cleaner 100 over the surface of the pool. Fastener means known in the art, such as a snap clip and the like, may be provided to releaseably join the telescoping pole to the coupling 145.

Figure 4:
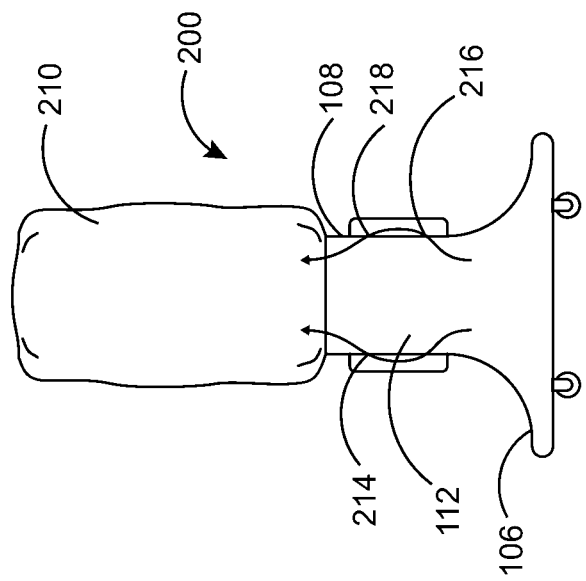
FIG. 4 is a side view of an alternate embodiment of an electrically powered pool cleaner.

Referring now to FIG. 4, an alternate embodiment of an electrically powered pool vacuum cleaner, is generally identified by the reference numeral 200. As indicated by the use of common reference numerals, the cleaner 200 is similar to the pool vacuum cleaner 100 with the exception that the cleaner 200 may include a hard cover 210 mounted on the housing 102 over the mesh filter bag. The top of the cover 210 may be perforated, permitting water to flow through the cover 210 back into the pool. The cover 210 may enhance the maneuverability of the cleaner 200 into tighter spaces and positioned in different orientations without the mesh filter bag flopping and draping over the housing 102 of the cleaner 200.

The cleaner 200 may further include a rotatable sleeve 214 mounted on the exterior of the housing 102. The sleeve 214 includes internal blades that upon rotation of the sleeve 214 draws fluid through a plurality of inlet ports 216 and discharges fluid through a plurality of outlet ports 218 in the conduit 108 at an accelerated velocity into the axial passageway 112, which in turn accelerates fluid flow through the passageway 112. Water and debris from below the pool cleaner 200 may thus be drawn upwardly through the passageway 112 and into the filter bag where the debris is trapped in the filter bag and the filtered water passes through the mesh bag and hard cover 210 back into the pool.

While a preferred embodiment of the invention has been shown and described, other and further embodiments of the invention may be devised without departing from the basic scope thereof, and the scope thereof is determined by the claims which follow.

The invention claimed is:

1. An electrically powered pool cleaner, comprising:
   a) a housing including a base and a conduit extending generally vertically from said base, said conduit defining an axial passageway through said housing;
   b) a mesh filter bag removably connected to said housing;
   c) a plurality of rollers mounted on a bottom surface of said base;
   d) a sleeve rotatably supported in said conduit, said sleeve including a plurality of blades projecting inward toward an unobstructed central portion of said passageway;
   e) a motor operatively connected to said sleeve; and
   f) a power supply operatively connected to said motor.

2. The pool cleaner of claim 1 wherein said sleeve is rotatably supported in said housing by a plurality of rollers disposed between said sleeve and said conduit of said housing.

3. The pool cleaner of claim 1 wherein said power supply includes a battery compartment housing a removable battery cartridge.

4. The pool cleaner of claim 3 wherein said battery cartridge includes a plurality of AA batteries.

5. The pool cleaner of claim 3 wherein said battery cartridge includes a plurality of rechargeable batteries.

6. The pool cleaner of claim 3 wherein said battery compartment includes seal means for forming an impervious seal about said battery cartridge.

7. The pool cleaner of claim 1 including a ring gear fixedly secured to said sleeve, said ring gear operatively engaged by a pinion gear driven by said motor.

8. The pool cleaner of claim 7 wherein said sleeve includes internal blades that upon rotation of said sleeve draws fluid and debris through the unobstructed central portion of said passageway.

9. The pool cleaner of claim 1 including a manually operable switch for activating operation of the pool cleaner in turbo mode.

10. The pool cleaner of claim 1 including a hard cover secured to said housing over said mesh filter bag, said hard cover including a perforated portion.

11. The pool cleaner of claim 1 wherein said sleeve is rotatably mounted on the exterior of said conduit.

* * * * *